Dec. 29, 1964    A. O. RADKE ETAL    3,163,466
SEAT STRUCTURE
Filed June 13, 1963    4 Sheets-Sheet 1
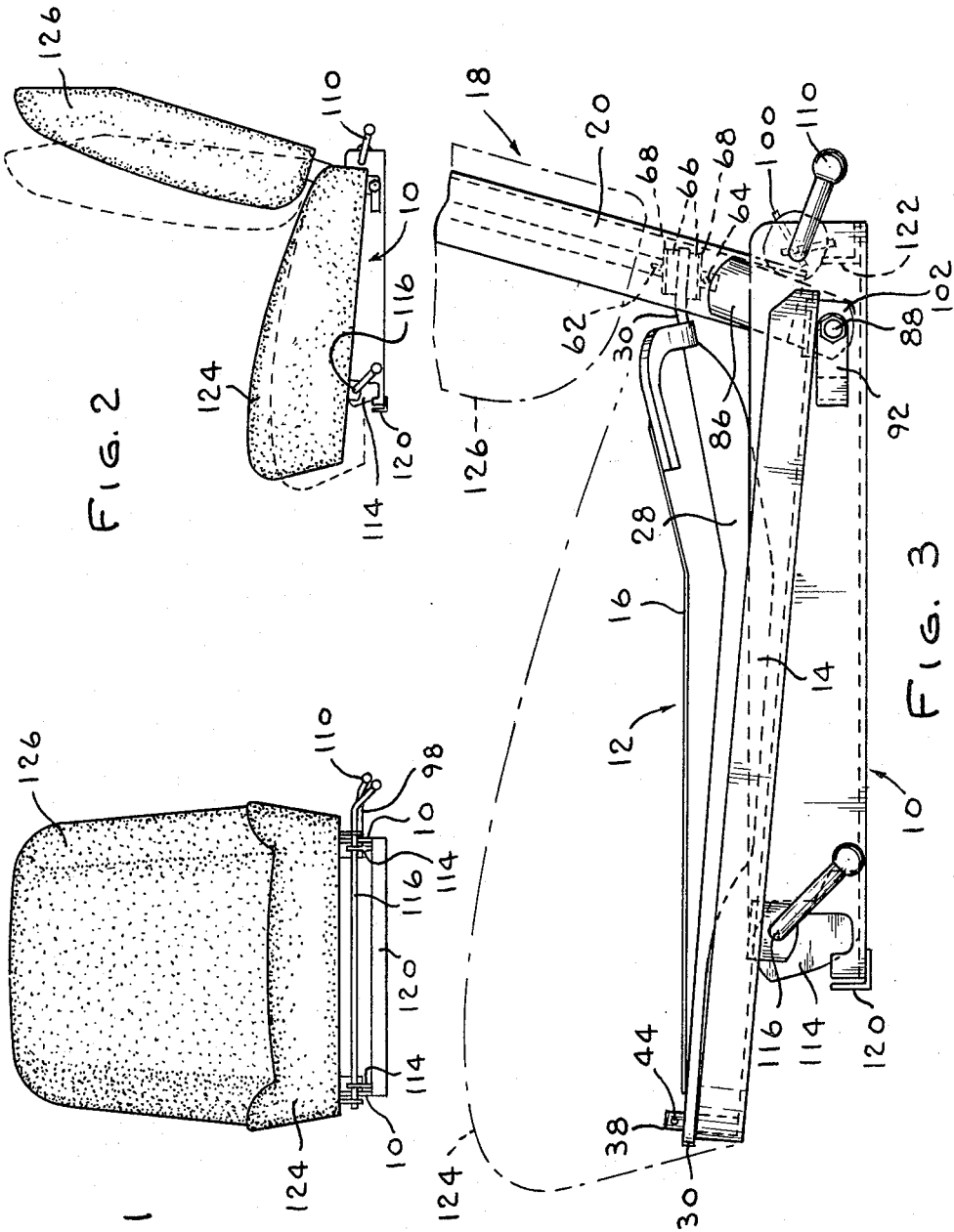
INVENTORS
ARTHUR O. RADKE
WILLIAM C. OSWALD
JOSEPH A. CHAMPA
BY Bayard H. Michael
ATTORNEY Dec. 29, 1964  A. O. RADKE ETAL  3,163,466
SEAT STRUCTURE
Filed June 13, 1963  4 Sheets-Sheet 2

INVENTORS
ARTHUR O. RADKE
WILLIAM C. OSWALD
JOSEPH A. CHAMPA
By Bayard H. Michael
ATTORNEY

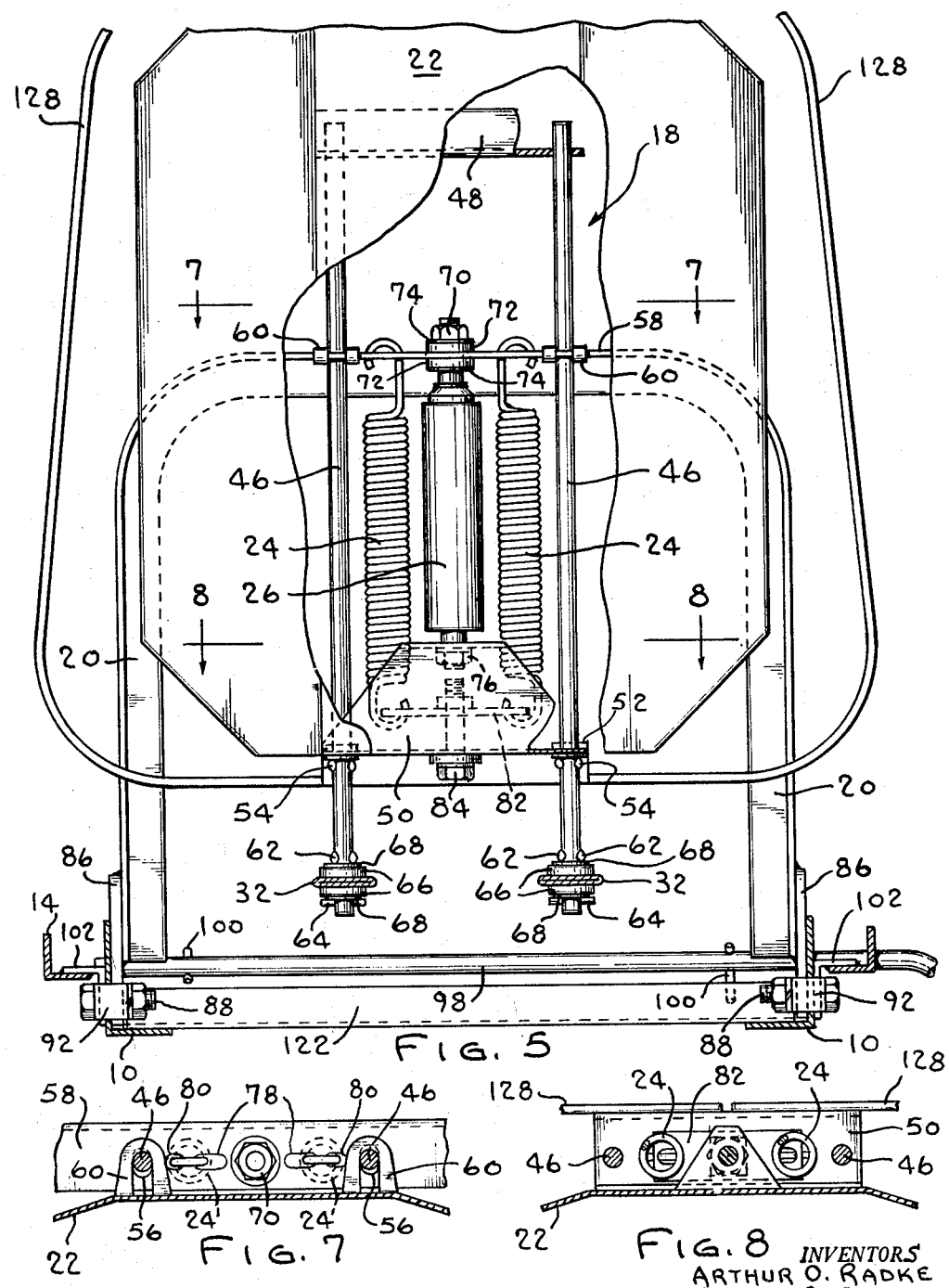

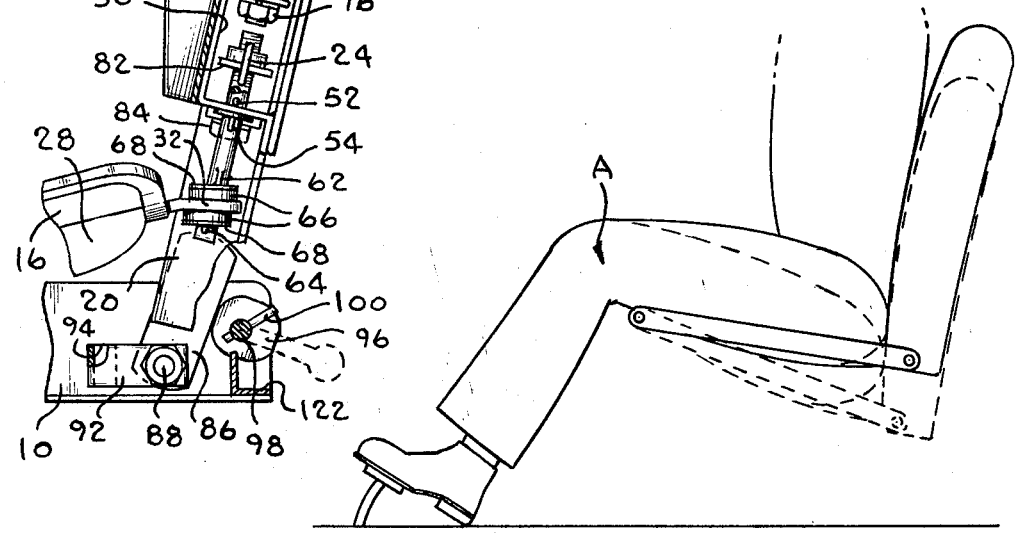

United States Patent Office 3,163,466
Patented Dec. 29, 1964

3,163,466
SEAT STRUCTURE
Arthur O. Radke and William C. Oswald, Wauwatosa, and Joseph A. Champa, Milwaukee, Wis., assignors to Bostrom Corporation, Milwaukee, Wis., a corporation of Wisconsin
Filed June 13, 1963, Ser. No. 287,634
11 Claims. (Cl. 297—307)

This invention relates to an improved vehicle seat.

The principal object of this invention is to provide a compact vehicle seat which will permit the occupant to maintain better control over the vehicle during the oscillation of the seat in its normal use.

The basic concept underlying this invention is that the oscillation of the seat should be such that during the oscillation the position of the occupant's hands and feet in respect to the hand and foot controls of the vehicle is not changed. In order to achieve this, a seat embodying the present invention is designed to cause the occupant to move in an arcuate path with the center located at the occupant's knee point, i.e. to cause the occupant to pivot around his knees. This type of motion does not affect the occupant's feet and thus not their position in respect to the foot controls. In order to maintain the occupant's hands in the same position during oscillation of the seat, the back cushion of the seat is suspended for lineal vertical or slightly backwardly inclined travel, thereby causing a corresponding lineal travel of the occupant's back. This type of motion in turn permits the occupant's arms to pivot around the shoulders without affecting the position of the hands in respect to the hand controls. This motion also does not affect the occupant's ability to maintain his eyes fixed on the road or on the instrument panel during severe oscillations of the seat. Also rubbing between the occupant's back and the back pan is eliminated.

In seats of normal depth, such as used in most passenger automobiles and trucks, the occupant's knees are positioned at the front edge of the seat cushion. In such seats the seat pan is connected for pivotal motion around its front edge, thereby causing the occupant to move pivotally around his knees during oscillation. To attain the lineal travel of the occupant's back, the seat pan is mounted for vertical or backwardly inclined motion along a predetermined line and to oscillate in phase with the seat pan. This is attained by providing suitable guide members for the back pan, and by pivotally connecting the back pan to the back edge of the seat pan. This structure will cause any motion of the seat pan to impart a corresponding motion to the back pan, thereby eliminating any relative movement between the back cushion and the occupant's back during oscillation of the seat.

To attain compactness of the seat, the entire room below the seat pan is left free to allow room for the oscillation of the seat, and the spring structure usually found under the seat pan is incorporated in the back support structure. Further, to provide acceptable vibration isolation of the occupant, shock absorbing means are also carried by the back support structure and cooperate with the springs to provide satisfactory transmissability to the seat structure over wide range of frequencies.

In addition, to render the seat equally suitable for various size occupants or various road conditions, the seat embodies features which permit adjustment of the inclined position of the back cushion and also adjustment of the inclined position of the seat cushion.

In view of the above, it is a further object of this invention to provide a compact vehicle seat which will have favorable transmissability characteristics over wide range of frequencies, and to incorporate therein means for adjusting the position of the back cushion and of the seat cushion.

Other objects and advantages will be pointed out in or be apparent from the specification and claims, as will obvious modifications of the two embodiments shown in the drawings, in which:

FIG. 1 is a front view of a vehicle seat embodying the present invention;

FIG. 2 is a side view of the seat shown in FIG. 1 and showing the seat and back cushion in adjusted position in dashed lines;

FIG. 3 is a side view of the seat pan assembly, with a fragment of the back pan assembly being shown;

FIG. 5 is a front view of the back pan assembly with a portion of the back pan being broken away to show the springs and the shock absorber;

FIG. 6 is a cross sectional side view of the back pan assembly, with a fragment of the seat pan assembly being shown;

FIG. 7 is a view taken on line 7—7 of FIG. 5;

FIG. 8 is a view taken on line 8—8 of FIG. 5;

FIG. 11 is a schematic view showing the effect of a seat embodying the present invention upon the legs of its occupant.

Figure 4:
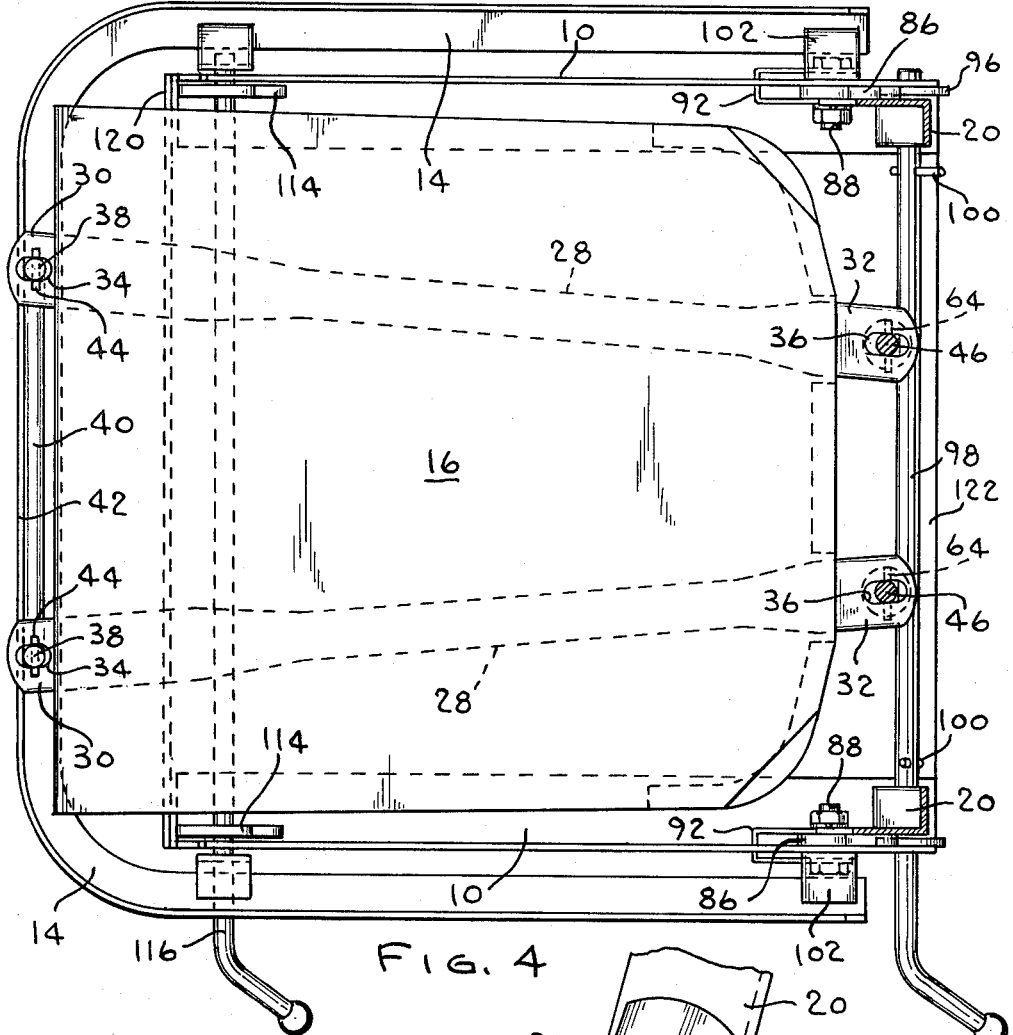
FIG. 4 is a top view of the seat pan assembly.
Figure 10:
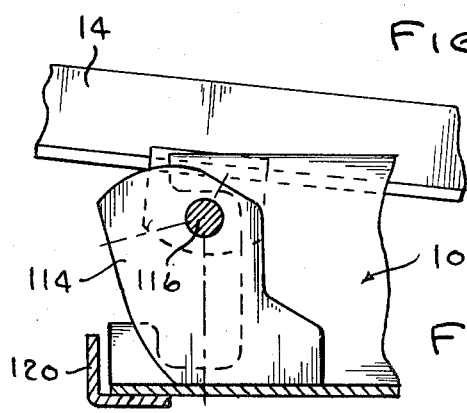
FIG. 10 is a detail view of the seat cushion adjustment cam.
Figure 9:
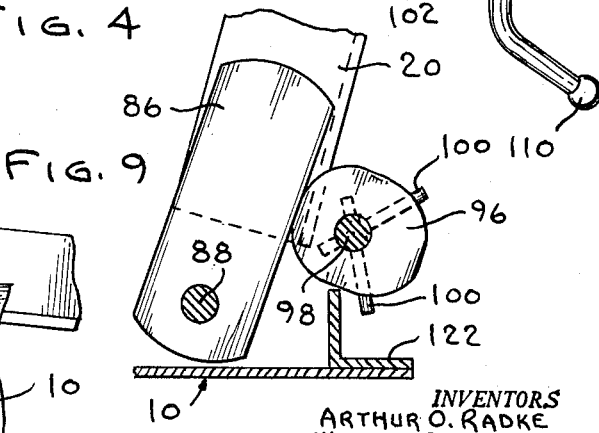
FIG. 9 is a detail view of the back cushion adjustment cam.

The drawings show a vehicle seat having normal seat cushion depth, in effect such that the occupant's knees rest substantially at the front edge of the seat cushion as indicated at A in FIG. 11. The basic components of this seat are a mounting frame 10 which is adapted to be secured either adjustably or permanently to a base member such as the floor or frame of the vehicle, a seat pan assembly 12 comprised of a seat frame 14 pivotally secured to the mounting frame, and a seat pan 16 pivotally secured at its front edge to the seat frame, and a back frame assembly 18 which is comprised of a back frame 20 pivotally secured at its lower end to the mounting frame 10 and a back pan 22 mounted for slidable movement in respect to the back frame and pivotally secured at its bottom edge to the seat pan 16. The structure is resiliently supported by two coil springs 24 which cooperate with a shock absorber 26 to vibrationally isolate and damp the seat structure and thereby achieve acceptable transmissability over wide range frequencies. In this respect, it is of note that the shock absorber and springs have to be in parallel and in the same system (to isolate the same load) in order to achieve the desired transmissability characteristics.

The seat pan is provided with two tubular support members 28 which have flat tabs 30 and 32 extending over the front and back edges of the pan respectively. Tabs 30 are provided with elongated slots 34 and tabs 32 are provided with elongated slots 36. The slots 34 receive upstanding ends 38 of a U-shaped pan support rod 40 which is welded to the seat frame 14. The tabs are engaged by flange 42 of the seat frame and by pins 44 provided in the ends 38. This type of connection fixes the seat pan in respect to the seat frame, however, permits limited pivotal motion of the pan around its front edge. The slots 36 receive back pan guide rods 46, and are also secured thereto for pivotal motion. It is of note that the slot-pin type of connections of the seat pan to the seat frame and back pan provides some fore and aft clearance for the ends of rod 40 and rods 46. This clearance could be provided at only one of the pivotal connections of the seat pan; however some clearance is necessary to attain the above described motion of the seat pan.

The back pan 22 is mounted for limited lineal motion in the plane of the back frame 20 by means of guide rods 46 which are attached to the back pan by an upper bracket 48 and a lower shock absorber bracket 50. Both brackets are welded to the back pan. The rods are welded to the upper bracket and fixed to the shock absorber bracket by pins 52 and nibs 54. They pass through slots 56 in the flange 58 of the back frame and are engaged by nylon liners 60 which serve to provide a suitable bearing surface for the rods. The lower ends of the rods are secured to the tabs 32 of the seat pan by means of nibs 62 and pin 64 which serve to retain resilient washers 66 on both sides of the tabs. To avoid undue wear of the washers, flat steel washers 68 are provided on their outside surfaces. It is seen that the back pan and the seat pan are assembled for unitary motion wherein the seat pan will pivot around its front edge, and thus impart motion by means of the rods 46 to the back pan, which will move in the plane of the back frame 20.

The shock absorber 26 is secured to the flange 58 by means of a nut 70, resilient washers 72, and flat steel washers 74, and to the shock absorber bracket 50 by another nut 76. A pair of coil tension springs 24 are secured in suitable apertures 78 and 80 in the flange 58 of the back frame and are connected to a spring adjustment bracket 82 which is adjustably secured to the shock absorber bracket 50 by means of bolt 84. As best seen from FIG. 5, the bolt can be adjusted to vary the relative position of the spring adjustment bracket in relation to the back frame and to thereby vary the preload of the springs 24. As is well-known in the art, such preload has to be adjusted in order to adapt the seat for various loads and/or road conditions.

A foot 86 is welded to each of the back frame which is pivotally secured to the mounting base by hinge pins 88. A clip 92 is passed through an aperture 94 in the mounting frame and provides a seat for the head of the hinge pin and nut 90, thereby preventing the nut from being loosened because of the motion between the seat and back frames. The back frame is retained in the rearwardly inclined position by back adjustment cams 96, which engage the foot 86. The cams are secured to a rod 98 which is carried for rotation by the mounting base 10. The rod is provided with two stop pins 100 by means of which the cam can be positioned in three separate stations to thereby vary the angle of the back frame. A suitable knob 110 is provided for this purpose.

The seat frame 14 is also pivotally secured to the mounting frame 10 by hinge pin 88 which engages a rear pivot bracket 102 of the seat frame. The position of the seat frame in respect to the mounting base is controlled by the seat adjustment cam 114. This cam is provided with a contour which permits the adjustment of the seat frame to several frontwardly inclined positions. It is of note that both the adjustment of the back frame assembly, as well as of the seat frame, does not in any way affect the suspension of the seat pan 12 nor the back pan 22, nor in any way affects the position and the effect of the shock absorber 26 and springs 24 on the seat structure.

The mounting frame 10 has a front cross channel 120 and rear cross channel 122, which channels serve as stiffening members for the frame.

The seat and back frame assemblies are encased in suitable resilient cushions 124 and 126 which may be molded on the respective pans or attached thereto by other means. To enclose the shock absorber and springs within such cushioning, the back frame is provided with a border wire 128, which serves to space a liner from the back pan and to thereby encase this assembly.

Although but two embodiments of the present invention have been illustrated and described, it will be apparent to those skilled in the art that various changes and modifications may be made therein without departing from the spirit of the invention or from the scope of the appended claims.

We claim:
1. A vehicle seat comprising, a mounting member adapted to be fixed to the vehicle, a seat frame pivotally connected to said mounting member, a back frame pivotally connected to said mounting member, a seat pan pivotally connected at its front end to said seat frame, a back pan slidably mounted in said back frame and pivotally connected at its bottom end to the back end of said seat pan, and resilient means resisting the downward motion of said back pan, and adjustment means operable to change the relative angular position between said seat and back frames and thereby said seat and back pans without affecting said resilient means.

2. A vehicle seat according to claim 1 wherein said seat pan is connected to said seat frame by rod means which cooperate with slot means to permit limited fore and aft motion of said seat pan.

3. A vehicle seat according to claim 1 wherein said seat pan is connected to said back pan by rod means which cooperate with slot means to permit limited fore and aft motion of said seat pan.

4. A vehicle seat according to claim 1 including adjustment means for varying the preload of said resilient means.

5. A vehicle seat according to claim 9 wherein said resilient means comprise tension coil springs.

6. A vehicle seat according to claim 1 wherein said adjustment means comprise cam means operable to pivot said seat frame around its pivotal connection to said mounting base.

7. A vehicle seat according to claim 1 wherein said adjustment means comprise cam means operable to pivot said back frame around its pivotal connection to said mounting base.

8. A vehicle seat according to claim 1 including damping means in parallel with said resilient means and operable to damp the vibrations of said seat and back pan.

9. A vehicle seat according to claim 8 wherein said resilient and damping means are secured to said back pan and said back frame and are positioned adjacent the back side of the back pan.

10. A vehicle seat comprising, a mounting member adapted to be fixed to the vehicle, a seat frame and a back frame both being connected to said mounting member for relative pivotal movement in respect to each other, a seat pan pivotally connected at its front end to said seat frame, a back pan slidably mounted in said back frame and pivotally connected at its bottom end to the back end of said seat pan, resilient means resisting the downward motion of said seat and back pans, and adjustment means operable to change the relative angular position between said seat and back frame members.

11. A vehicle seat according to claim 10 wherein said resilient means comprise spring means which is connected at one of its ends to said back frame and is operably connected at the other of its ends for resiliently resisting the downward movement of said seat and back pans.

References Cited in the file of this patent

UNITED STATES PATENTS

| | | |
|---|---|---|
| 1,770,321 | Mougotte | July 8, 1930 |
| 2,430,604 | Dorton | Nov. 11, 1947 |
| 2,519,963 | Heffernan et al. | Aug. 22, 1950 |
| 2,562,041 | Keller et al. | July 24, 1951 |
| 2,712,346 | Sprinkle | July 5, 1955 |

FOREIGN PATENTS

| | | |
|---|---|---|
| 173,772 | Great Britain | Nov. 14, 1922 |
| 831,304 | France | May 30, 1938 |